C. S. PELTON.
HEATER FOR MOTOR PROPELLED VEHICLES.
APPLICATION FILED AUG. 8, 1919.
Reissued Nov. 11, 1919. 14,749.
Fig 1
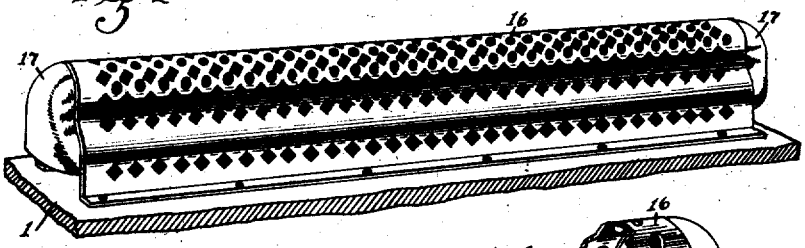
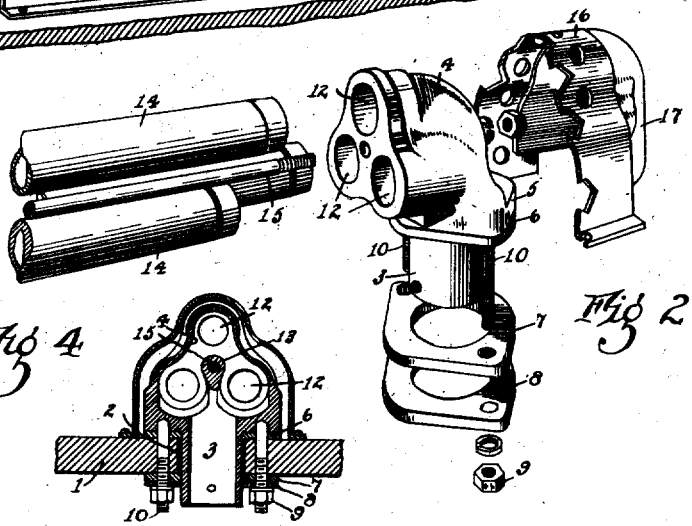
Fig 2
Fig 4
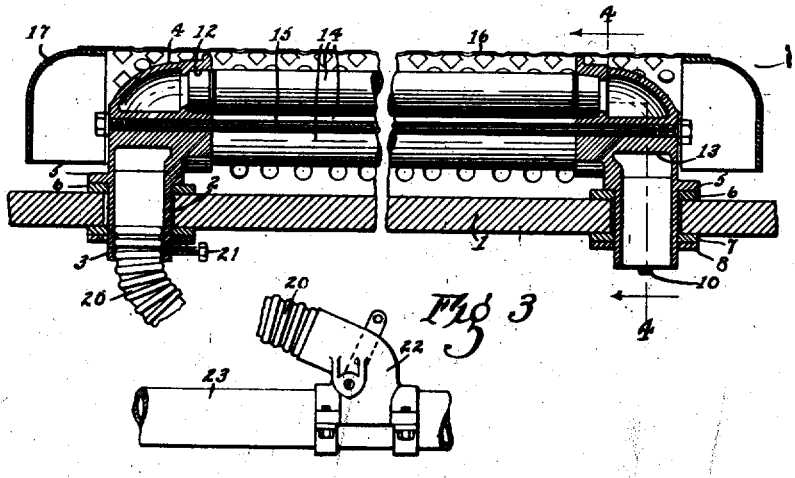
Fig 3
INVENTOR
Clyde S. Pelton
BY Hull Smith Brock & West
ATTY'S

UNITED STATES PATENT OFFICE.

CLYDE S. PELTON, OF CLEVELAND HEIGHTS, OHIO, ASSIGNOR, BY MESNE ASSIGNMENTS, TO THE PERFECTION HEATER & MANUFACTURING COMPANY, OF CLEVELAND, OHIO, A CORPORATION OF OHIO.

HEATER FOR MOTOR-PROPELLED VEHICLES.

14,749. Specification of Reissued Letters Patent. Reissued Nov. 11, 1919.

Original No. 1,309,216, dated July 8, 1919, Serial No. 135,299, filed December 6, 1916. Application for reissue filed August 8, 1919. Serial No. 316,261.

*To all whom it may concern:*

Be it known that I, CLYDE S. PELTON, a citizen of the United States, residing at Cleveland Heights, in the county of Cuyahoga and State of Ohio, have invented a certain new and useful Improvement in Heaters for Motor-Propelled Vehicles, of which the following is a full, clear, and exact description, reference being had to the accompanying drawings.

This invention relates to heaters for motor propelled vehicles whereby a portion of the exhaust gases from the gasolene engine are diverted through a suitable fitting in the passenger compartment for the purpose of warming the air therein.

The objects of the invention are the provision of a heater of maximum heating efficiency and minimum obstruction to the movement of the gases; the provision of a combined heater and foot-rest of compact construction, and high radiating efficiency; the provision of a foot-rest type of heater which shall be less susceptible to denting and bruising than prior devices; the provision of a cheap and simple, leak-proof and noiseless heater; while further objects and advantages will become apparent as the description proceeds.

In the drawings accompanying and forming a part of this application, I have illustrated one embodiment of my invention, although it will be understood that many modifications in construction and arrangement could be resorted to without departing from the scope of my inventive idea or losing the benefits to be derived therefrom. In these drawings, Figure 1 is a perspective view of the device as it appears in operation; Fig. 2 is a separated perspective view of a part of the device shown in Fig. 1: Fig. 3 is a longitudinal, vertical, sectional view through the device shown in Fig. 1 together with the exhaust and branch pipes: and Fig. 4 is a transverse sectional view taken upon the broken line 4—4 of Fig. 3 and looking in the direction of the arrows.

Describing the parts by reference characters, 1 represents a part of the automobile floor in which holes 2 are formed for the reception of my improved heater. At the end of this heater is the right angle fitting shown in perspective in Fig. 2 and comprising a nipple 3, head 4, and intermediate base flange 5 below which is located a gasket 6. Said nipple is secured in the floor by means of a second gasket 7 and collar 8, the latter being secured in place in a suitable manner as by nuts 9 engaging the bolts 10 cast in the flange 5. The head 4 of the fitting is thus located upon the opposite side of the base flange from the nipple 3 and is formed with a plurality of laterally turned sockets 12—12, here shown as three in number with their axes parallel to each other but perpendicular to that of the nipple 3. The webs between the adjacent sockets merge with a hollow boss 13 here shown as oval in cross section with its extended portion depending between the lowermost sockets which are arranged side by side horizontally.

In these sockets are located the ends of parallel pipes 14—14 whose opposite ends are received in the similarly arranged sockets or a second fitting which also has a base flange by which the same is supported. The fittings are secured upon the ends of the tubes by suitable means such as the tie-bolt 15 which traverses the alined bosses 13—13. One at least of the fittings is connected with the exhaust pipe and the engine which drives the automobile.

The whole device thus far described forms a radiator of small size and compact form, whose radiating effect is increased by covering the tubes 14—14 with a black conducting coating such for example as formed by phosphoric acid treatment. This radiator is then covered with a perforated sheet metal housing preferably of the type shown, since the shape and conformation illustrated embraces closely the surface of the pipes and affords the proper angle for a foot rest and, because of the longitudinally corrugated construction, is peculiarly resistant to denting or deformation, although I do not restrict myself to this form. Likewise I do not confine myself to the shape and arrangement of apertures shown in the casing 16, although my experience indicates that the combination of squares and circles indicated herein affords a larger amount of strength for a given amount of opening than any other. The ends of this housing are formed of rounded sheet metal pieces 17, 17 conforming in shape to the body of the housing and rigidly secured thereto as by riveting or welding so as to prevent collapse thereof. For attaching this heater to the exhaust pipe I preferably employ a flexible metallic tube 20, secured to one of the nipples 3 in any convenient manner as by being merely inserted therein and secured by a set screw 21. The opposite end of this flexible tube is clamped within the side branch of a valved connection 22, which is clamped upon the exhaust pipe 23 at any convenient place.

The particular construction of the valve fitting is entirely immaterial as regards this invention, as is also the direction of attaching the device. The heater being symmetrical in shape, it will be seen that it can be readily reversed depending upon whether the exhaust pipe lies at one or the other side of the vehicle or depending upon the number of obstructions adjacent thereto. This flexible tubing forms, in effect, an elbow, which can be reversed or changed in direction at will.

In order to secure quick and efficient heating it is necessary that the hot gases be delivered through the heater pipe with the greatest possible speed, since the rate of interchange of heat between the gases and the pipes, increases with the fifth power of the absolute temperature; and this rapidity of circulation must be secured entirely by the freedom of the passage through the heater and not by obstructing the main exhaust pipe in any degree since that would involve placing an extra load upon the engine which propels the vehicle. Therefore it is essential to employ a heater having no return bends and the smallest possible number of sharp angles, and preferably having provision therein for an expansion of the hot gases immediately upon their admission to the heater and with no requirement for contraction until they have become thoroughly cooled. This result I attain by making the cross-sectional area of the three tubes 14—14 considerably greater than the cross sectional area of the nipples 3—3, so that at the hot end the gases can expand quickly, the corresponding reduction of the outlet being unimportant since the gas pressure will have become greatly reduced by the time the impulses reach this point owing to the very rapid radiation. This is accomplished by the large surface area of the tubes, by making them thin walled, preferably about 20 gage steel or copper tubing, and by a surface treatment to facilitate radiation as already described. The triangular arrangement of the tubes also provides with peculiar convenience for the reception of the tie bolt. However it will be understood that many other constructions and arrangements could be employed within the scope of my invention, wherefore I do not restrict myself to the details of construction or arrangement herein illustrated except as the same are specifically recited in the claims hereto annexed or rendered necessary by the prior state of art.

Having thus described my invention, what I claim is:—

1. In a heater for motor propelled vehicles, a pair of end fittings each comprising a hollow nipple and three sockets whose axes are perpendicular to said nipple, said sockets being arranged at the apices of an equilateral triangle whose base is perpendicular to said nipple and all of said sockets being in free communication with the nipple interior, three heating pipes connecting said fittings and having their ends received in corresponding sockets, and a tie bolt connecting said fittings and drawing the same upon said pipes.

2. In a heater for motor propelled vehicles, a pair of end fittings each comprising a hollow nipple and three sockets whose axes are perpendicular to said nipple, said sockets being arranged at the apices of an equilateral triangle whose base is perpendicular to said nipple and all of said sockets being in free communication with the nipple interior, three heating pipes connecting said fittings and having their ends received in corresponding sockets, means securing said fittings upon the ends of said pipes, and a perforated sheet metal housing covering said pipes and conforming generally to the contour thereof.

3. In a heater for motor propelled vehicles, the combination with a support, of a pair of hollow end fittings each having a base flange resting on said support and three parallel sockets arranged at the apices of a triangle, the axes of said sockets being parallel to said support, three heating pipes connecting said fittings and having their ends received in corresponding sockets, means securing said fittings to said pipes, a perforated sheet metal housing secured to said support independently of said fittings and covering said pipes, and means whereby one of said fittings can be connected to the exhaust pipe of an internal combustion motor.

4. In a heater for motor propelled vehicles, a hollow end fitting having a base and a nipple projecting through said base, said fitting being provided upon the opposite side of said base from said nipple with a plurality of pipe receiving sockets arranged inside a triangle and having their axes parallel to each other and perpendicular to said nipple, heating pipes having their ends received in said sockets, a second fitting having sockets receiving the opposite ends of said pipes, means securing said sockets upon said pipes, and a perforated sheet metal housing covering said pipes and conforming generally to the contour thereof.

In testimony whereof, I hereunto affix my signature.

CLYDE S. PELTON.